United States Patent

Henbo et al.

[11] Patent Number: 5,871,833
[45] Date of Patent: Feb. 16, 1999

[54] FORGERY-PREVENTIVE FRETWORK PAPER

[75] Inventors: Motoshi Henbo; Toshiyuki Hirabe, both of Ibaraki, Japan

[73] Assignee: Oji-Yuka Synthetic Paper Co., Ltd., Tokyo, Japan

[21] Appl. No.: 782,117

[22] Filed: Jan. 13, 1997

[30] Foreign Application Priority Data

Mar. 19, 1996 [JP] Japan .................................. 8-113056

[51] Int. Cl.⁶ ................ B32B 3/00; B31F 1/07; B42D 15/10
[52] U.S. Cl. ................ 428/138; 428/141; 428/156; 428/910; 428/916; 428/516; 101/32; 283/107; 283/108; 283/109; 283/110; 283/111
[58] Field of Search ..................... 428/141, 156, 428/138, 516, 910, 916; 101/32; 283/107, 108, 109, 110, 111

[56] References Cited

U.S. PATENT DOCUMENTS

| | | | |
|---|---|---|---|
| 4,663,216 | 5/1987 | Toyoda et al. | 428/212 |
| 5,298,307 | 3/1994 | Suzuki et al. | 428/141 |

*Primary Examiner*—William P. Watkins, III
*Attorney, Agent, or Firm*—Oblon, Spivak, McClelland, Maier & Neustadt, P.C.

[57] ABSTRACT

A forgery-preventive fretwork paper comprising a support layer and an engraving coating layer, the support layer being a stretched laminate which comprises a biaxially stretched propylene resin film layer as a base layer and, laminated thereto on each of front and back sides thereof, a uniaxially stretched propylene resin film layer containing fine inorganic powder, wherein said support layer has (1) an opacity (JIS P-8138) of from 50 to 100% and (2) a density (JIS P-8188) of from 0.70 to 1.4 g/cm³, and the paper bearing an engraving extending into the engraving coating layer or to one of the uniaxially stretched films of the support layer.

19 Claims, 2 Drawing Sheets

FORGERY-PREVENTIVE FRETWORK PAPER

BACKGROUND OF THE INVENTION

1. Field of the Invention

The present invention relates to a forgery-preventive fretwork paper which is suitable for use in traveler's checks, securities, ID cards, passports, and the like which all are less forgeable.

2. Discussion of the Background

Traveler's checks, securities, and ID cards are required to be less forgeable. Forgery-preventive techniques for these have included the following.

Group I:

(1) To use a print containing a fluorescent substance therein.

(2) To print with a magnetic ink to enable any change in ink density to be visually recognized based on a magnetic function.

(3) To print with a printing ink containing a photochromic dye (see JP-A-60-79992; the term "JP-A" as used herein means an "unexamined published Japanese patent application").

(4) To print with an ink having specific reflection-spectroscopic properties or with two or more inks which differ from each other in reflectance by at least a given value.

(5) A print produced overprinting of drawing line which changes angle drawing line and consists of 10,000 lines of colorless transparent ink for concave printing after ink drying is complete (see JP-A-5-177919).

(6) To form an appearance which enables forgery detection, as in a print bearing a fretwork (latent image) (see JP-A-6-15794).

Group II:

(7) A print having a device which makes the characters and designs on copies thereof difficult to interpret or which produces a warning mark on copies thereof (see JP-A-U-59-64271; the term "JP-A-U" as used herein means an "unexamined published Japanese utility model application").

Group III:

(8) A print obtained with a special magnetic ink so that mere copies of the print can be revealed as fakes by a discriminator, or a print bearing halftone dots so that copies of the print differ from the original in dot density (see JP-B-56-19273 and JP-B-2-51742; the term "JP-B" as used herein means an "examined Japanese patent publication"); and a print bearing concealed characters which cannot be read with the naked eye but are readable by a discriminator (see JP-A-62-130874).

The forgery-preventive techniques given above in Groups I to III each is not a perfect forgery-preventive measure because most of the originals produced using these techniques can be copied by photolithography. The prior art techniques further have a drawback that since the printed characters or images peel off during the use of real checks or securities due to the poor adhesion of the printing ink to the sheet base and such checks or securities are sometimes misjudged to be fakes. It is therefore necessary to collect such real checks or securities and exchange them for fresh ones. In addition, even real checks or securities rumple during use, and the rumpled checks or securities are often rejected by a discriminator.

On the other hand, a fretwork paper comprising a support layer and an engraving layer is disclosed in JP-B-8-13539, which is characterized in that the support layer has an opacity of 70% or lower and the engraving layer has an opacity of 40% or higher, the opacity of the support layer being always lower than that of the engraving layer by at least 30%, and that an engraving is formed therein which extends from the engraving layer to the support layer. This prior art fretwork paper is advantageous in that discrimination is easy, and that the paper is effective in forgery prevention because the paper, in which the support comprises a transparent poly(ethylene terephthalate) film coated on each side with a pigmented coating layer and the engraving layer comprises a pigmented coating layer, is not easily available because of the complicated process for producing the same. However, the above fretwork paper has drawbacks that the resin film as the support is apt to develop burrs (whiskers) upon engraving, and that the paper is apt to rumple during paper feed or discharge or during use.

An object of the present invention is to provide a forgery-preventive fretwork paper which comprises a support layer and an engraving coating layer, and in which the drawbacks described above are mitigated by using a specific stretched laminate as the support layer.

SUMMARY OF THE INVENTION

The present invention provides a forgery-preventive fretwork paper comprising a support layer and an engraving coating layer, said support layer being a stretched laminate which comprises a biaxially stretched propylene resin film layer as a base layer and, laminated thereto on each of front and back sides thereof, a uniaxially stretched propylene resin film layer containing fine inorganic powder or organic pigment, said support layer having (1) an opacity (JIS P-8138) of from 50 to 100% and (2) a density (JIS P-8118) of from 0.70 to 1.4 g/cm$^3$, and said paper bearing an engraving extending into said engraving coating layer or to one of said uniaxially stretched films of said support layer.

Since a stretched propylene resin film laminate containing fine inorganic powder or organic pigment as a support layer have been oriented, it has sufficient nerve. Consequently, the fretwork paper of the present invention not only can be easily fed for printing and discharged, but also is less apt to rumple.

Further, since an engraving is formed which extends to one of the uniaxially stretched films (front or back layer), which has high strength and toughness, the engraved forgery-preventive fretwork paper is free from burrs (whiskers) in the support layer.

In addition, since a distinct engraving which is translucent or opaque can be formed according to the depth to which the engraving extends, the fretwork image can be clearly recognized when the paper is held up to the light incident on the back side.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
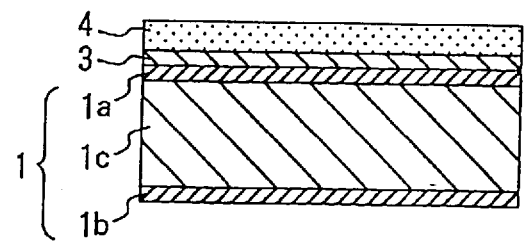
FIG. 1 is an enlarged sectional view of one embodiment of the forgery-preventive fretwork paper of the present invention.

DESCRIPTION OF THE SYMBOLS 1 support layer
1a uniaxially stretched layer
1b uniaxially stretched layer
1c biaxially stretched layer
2 pigmented coating layer
3 primer layer
4 engraving layer
5 image area
6 background part
7 printed pattern

DETAILED DESCRIPTION OF THE PREFERRED EMBODIMENTS

Support Layer

The support layer may be a stretched laminate which comprises a biaxially stretched propylene resin film layer as a base layer and, laminated thereto on each of front and back sides thereof, a uniaxially stretched propylene resin film layer containing fine inorganic powder, wherein said support layer has (1) an opacity (JIS P-8138) of from 50 to 100% and
(2) a density (JIS P-8118) of from 0.70 to 1.4 g/cm$^3$.

Non-limiting examples of the propylene resins include propylene homopolymer; copolymers of propylene as the main monomer with one or more α-olefins such as ethylene, butene-1, hexene-1, heptene-1, octene-1, and 4-methylpentene-1; and modified propylene resins produced by grafting 0.1 to 10 wt % one or more vinyl monomers such as maleic anhydride, acrylic acid, methacrylic acid, styrene, methyl acrylate, glycidyl methacrylate, and 2-hydroxyethyl methacrylate onto those propylene polymers or copolymers. The propylene resins each has a melting point of from 130° to 180° C. and a crystallinity of from 20 to 75%.

These propylene resins may contain a resin such as, e.g., low-density polyethylene, linear low-density polyethylene, an ethylene/vinyl acetate copolymer, an ethylene/acrylic acid copolymer, a metal (K, Na, Li, Zn, or Al) salt of an ethylene/methacrylic acid copolymer, or an ethylene/alkyl acrylate copolymer in an amount of up to 30% by weight. The propylene resins may further contain a stabilizer, an ultraviolet absorber, a nucleating agent, a dispersant, etc. in an amount of up to 2% by weight.

Usable fine inorganic powder include calcium carbonate, calcined clay, diatomaceous earth, vermiculite, talc, mica, titanium oxide, barium sulfate, an aluminum powder, and the like which each has a particle diameter of from 0.05 to 3 μm. Such fine inorganic powder is incorporated into the whole support layer in an amount of from 10 to 55% by weight to opacify the propylene resin in the support layer. Preferred is a combination of an inexpensive extender pigment, e.g., calcium carbonate, calcined clay, or diatomaceous earth, and a reflective pigment with a high reflectance, e.g., titanium oxide, barium sulfate, zinc oxide, or an aluminum powder.

The support layer may be obtained, for example, by stretching a propylene resin film containing from 0 to 30% by weight, preferably from 6 to 25% by weight based on said polypropylene resin film, fine inorganic powder in the machine direction from 3 to 7 times at a temperature lower than the melting point of the propylene resin, subsequently laminating a film of a molten propylene resin containing from 10 to 55% by weight based on said film of molten propylene resin of fine inorganic powder to one or both sides of the film stretched in the machine direction, reheating the resulting laminated film, stretching the laminated film in the transverse direction from 5 to 12 times in a temperature range of from the temperature lower than the melting point of the propylene resin by 15° C. to the temperature higher than that melting point by 10° C., and then annealing the stretched laminate.

The melting point of a propylene resin herein means the peak temperature in the DSC curve of the resin. If the DSC curve has two or more peaks, the temperature at which the highest peak appears is taken as the melting point.

By using stretching temperatures close to or not lower than the melting points of the propylene resins, the generation of microvoids in the support layer can be inhibited or diminished.

A film layer of a propylene resin or ethylene resin comprising from 0 to 3% by weight based on said layer of fine inorganic powder may be further formed on the surfaces of a uniaxially stretched layer and the biaxially stretched layer or on the surface of a uniaxially stretched layer. This optional layer may have been stretched or not.

The uniaxially stretched film layers of the support are preferably subjected to an oxidation treatment, e.g., corona discharge treatment, ozone treatment, or plasma treatment, in order to improve the adhesion of a printing ink thereto. Further, in order to enhance printing ink adhesion, the surface of the support is preferably coated with an antistatic water-soluble polymer in an amount of from 0.5 to 5 g/m$^2$ on a solid basis. Examples of the antistatic water-soluble polymer include polyethyleneimine, poly(ethyleneimine-urea), ethyleneimine adducts of polyamine-polyamides, and nitrogen-containing, cationic or amphoteric polymers.

The total thickness of the support layer may be from 50 to 210 μm, preferably from 60 to 150 μm. The thickness of the biaxially stretched base layer of the support may be from 40 to 150 μm, preferably from 40 to 100 μm, while that of each uniaxially stretched layer may be from 5 to 30 μm, preferably from 8 to 20 μm.

The support preferably has an opacity of from 50 to 100%, preferably from 65 to 85% as measured by JIS P-8138. If the opacity thereof is lower than 50%, the engraving has an indistinct outline.

Since the uniaxially stretched layer of the support is partly removed by engraving, the engraved part of the support comes to have an opacity of from 30 to 80%, even though the opacity of the unengraved support is 100%. Consequently, the outline of the resulting fretwork is clearly seen when the fretworked paper is held up to the light incident on the back side of the support.

The support comes to have a reduced density through stretching, because microvoids are generated around the fine inorganic powder by stretching to thereby make the support layer translucent or opaque. The density of the stretched support layer is usually from 0.70 to 1.4 g/cm$^3$, preferably from 0.90 to 1.2 g/cm$^3$.

If the density thereof is lower than 0.70 g/cm$^3$, the support is too elastic for engraving. Supports having a density exceeding 1.4 g/cm$^3$ are difficult to produce, because an inorganic filler should be incorporated in a larger amount and stretching should be conducted in a lower stretch ratio.

A design or characters may be printed on the support surface.

Engraving Coating Layer

The engraving coating layer comprises a binder resin in an amount of from 20 to 50% by weight on a solid basis and fine inorganic powder in an amount of from 80 to 50% by weight on a solid basis, and has an opacity of 40% or higher, preferably from 50 to 100%.

The engraving coating layer may be obtained, for example, by coating the support surface with a coating fluid prepared by dispersing a binder resin and fine inorganic powder optionally together with an antistatic agent, a thickener, a water resistance improver, an antifoamer, an antiseptic, and a dispersant into a dispersion medium, and drying the coating.

Non-limiting examples of the binder resin include natural adhesives such as cellulose derivatives, latexes of conjugated-diene polymers such as styrene/butadiene copolymers and methyl methacrylate/butadiene copolymers, latexes of alkyl acrylate or methacrylate copolymers, starch, poly(vinyl alcohol), and synthetic polyurethane or polyester resin adhesives. These binder resins may be used alone or in combination of two or more thereof. Especially preferred are synthetic polyester or polyurethane resins which have satisfactory abrasion resistance.

Non-limiting examples of the fine inorganic powder include inorganic pigments having a particle diameter of from 0.05 to 5 $\mu$m, such as kaolin, clay, ground calcium carbonate, precipitated calcium carbonate, aluminum hydroxide, titanium dioxide, satin white, calcium sulfite, and amorphous silica. Examples thereof further include organic pigments known as plastic pigments, such as melamine cyanurate and melamine, and binder pigments which function also as an adhesive. Preferred of these from the standpoint of abrasion resistance are an inorganic powder or organic pigment which has a small particle diameter and is capable of opacifying the coating layer in a small addition amount. Especially preferred is titanium dioxide.

For applying the coating fluid to the support surface, a known coating apparatus may be used, such as, e.g., a bar coater, roll coater, air-knife coater, gravure coater, or die coater. The spread rate of the coating fluid is generally from 5.0 to 30 g/m$^2$, preferably from 10 to 20 g/m$^2$, on a solid basis. The support may be thus coated on one or both sides.

Applying the coating fluid in such an amount gives an engraving coating layer having a thickness of from 5 to 30 $\mu$m, preferably from 10 to 20 $\mu$m.

A primer layer may be formed between the support layer and the engraving coating layer in order to satisfactorily bond both layers. Although either a transparent primer layer or an opaque one may be formed, an opaque one may be preferred in the case where a finely gradated image is to be formed by engraving. The opaque primer layer contributes to a higher opacity. From the standpoint of forgery prevention, a colored primer layer or a multilayered primer layer may be formed. In this case, a primer layer having a color different from those of the support layer and the engraving layer is more effective in forgery prevention. It is also possible to print a pattern as a primer layer for forgery prevention.

The thickness of the primer layer may be from 0.5 to 10 $\mu$m, preferably from 1 to 5 $\mu$m.

In the present invention, when the support layer has a primer layer, the opacity of the support layer means the opacity of both the support layer and the primer layer.

Examples of the constitution of the fretwork paper of the present invention are then explained by reference to the drawings.

Figure 2:
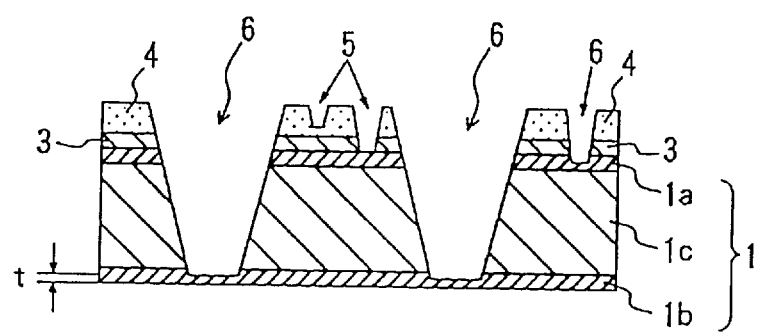
FIG. 2 is an enlarged sectional view illustrating the fretwork paper shown in FIG. 1 in which an engraving has been formed.

FIG. 1 is an enlarged sectional view illustrating an embodiment of the fretwork paper. This embodiment comprises a support layer 1 and an engraving layer 4 formed thereon through a primer layer 3. In the fretwork paper having such constitution, an image area 5 is formed by engraving as shown in FIG. 2, and background parts 6 and 6 are formed on both sides of the image area by engraving the paper to the uniaxially stretched film layer 1$a$ or 1$b$ of the support 1. The resulting image can be clearly recognized as a clear shadow, when the paper is held up to the light incident on the back side of the paper.

The engraved support layer has an unengraved layer, the thickness of which (t) varies depending on the opacity of the support layer and on the image formed by engraving.

In the case where the engraving 6 extends to the uniaxially stretched layer 1$b$, the thickness t may be from 3 to 28 $\mu$m, preferably from 5 to 20 $\mu$m.

It is preferred to form an engraving in the direction perpendicular to the stretching direction for the uniaxially stretched layers of the support from the standpoint of preventing the generation of whiskers to make the outline of the engraving clear.

Figure 3:
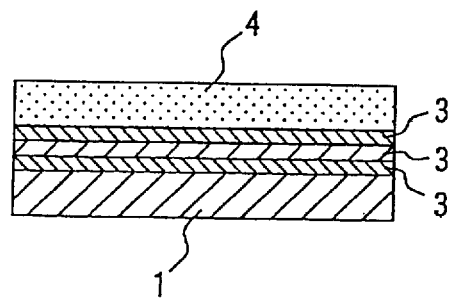
FIG. 3 is an enlarged sectional view of another embodiment of the forgery-preventive fretwork paper of the present invention.
Figure 4:
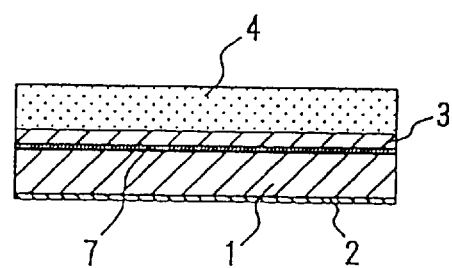
FIG. 4 is an enlarged sectional view of still another embodiment of the forgery-preventive fretwork paper of the present invention.

FIG. 3 is an enlarged sectional view of a fretwork paper which comprises a support layer 1, three colored primer layers 3 formed thereon which differ from one another in lightness or hue, and an engraving layer 4 formed on the primer layers 3. FIG. 4 is an enlarged sectional view of a fretwork paper which comprises a support layer 1, a pigmented coating layer 2 with satisfactory suitability for writing formed on the back side of the support layer 1, a printed pattern 7 formed on the front side of the support layer 1, and an engraving layer 4 formed thereon through a colored primer layer 3. When an engraving such as the engravings 5 and 6 shown in FIG. 2 is formed in these fretwork papers, a clear image can be recognized with transmitted light.

The present invention will be explained below in more detail by reference to the following Examples. In the Examples and Comparative Examples, all parts are by weight.

Production of Stretched Resin Film Laminates Containing Fine Inorganic Powder

Production Example 1

(1) A mixture (A) consisting of 80 wt % propylene homopolymer having a melt flow rate (MFR) of 1 g/10 min (melting point, 164° C.), 8 wt % high-density polyethylene, and 12 wt % calcium carbonate was melt-kneaded with an extruder at 240° C. The melt was extruded out through a die into a film, which was cooled with rolls to obtain an unstretched film. This film was heated to 155° C. and then stretched in the machine direction 5 times.

(2) A mixture (B) prepared by compounding 56 wt % polypropylene having an MFR of 4.0 g/10 min with 40 wt % calcium carbonate having an average particle diameter of 1.5 $\mu$m, 0.5 wt % anatase titanium oxide having an average particle diameter of 0.8 $\mu$m, and 3.5 wt % high-density polyethylene was melt-kneaded with an extruder. The melt was extruded out in a shape of a film through a die to laminate to a front side of the stretched film in (1) above. The same mixture (B) was melt-kneaded with another extruder, extruded and laminated to a back side of the stretched film in (1). The resulting laminate was heated to 160° C. and then stretched in the transverse direction 7.5 times.

(3) The surface of this three-layer laminated film was treated with corona discharge. The laminate of a three-layer structure has a thicknesses of 90 $\mu$m ((B)/(A)/(B)=20/50/20 $\mu$m).

An aqueous solution of a mixture of polyethyleneimine and an epichlorohydrin adduct of a polyamide in a weight ratio of 1:1 was applied to the surface of the laminate obtained above, and the coating was dried to form a primer layer having a thickness of 0.5 μm.

Properties of this four-layer laminated film are shown in Table 1.

Production Example 2

(1) A mixture (A) consisting of 89 wt % propylene homopolymer having a melt flow rate of 0.8 g/10 min (melting point, 164° C.), 8 wt % high-density polyethylene, and 3 wt % calcium carbonate powder having a particle diameter of 1.5 μm was melt-kneaded with an extruder. The melt was extruded with a die into a film, which was cooled with rolls to obtain an unstretched film. This film was heated to 155° C. and then stretched in the machine direction 5 times.

(2) Polypropylene (C) having an MFR of 4.0 g/10 min and a composition (B) prepared by compounding 50.5 wt % polypropylene having an MFR of 4.0 g/10 min with 45 wt % calcined clay having an average particle diameter of 1.2 μm, 1.0 wt % titanium oxide having a particle diameter of 0.8 μm, and 3.5 wt % high-density polyethylene were separately melt-kneaded with two extruders. The melts were coextruded through a die, and the resulting coextrusion film was laminated to each side of the film stretched 5 times in (1) above, in such a manner that the films (C) constituted the outermost layers. The resulting five-layer laminate was heated to 185° C. and then stretched in the transverse direction 7.5 times.

(3) The surface of this five-layer laminated film was treated with corona discharge. The obtained laminate of a five-layer structure has a thicknesses of 150 μm ((C)/(B)/(A)/(B)/(C)=5/30/80/30/5 μm).

Properties of this five-layer laminated film are shown in Table 1.

Production Example 3

(1) A mixture (A) consisting of 92 wt % propylene homopolymer having an MFR of 1.0 g/10 min (melting point, 164° C.) and 8 wt % high-density polyethylene was melt-kneaded with an extruder. The melt was extruded through a die into a film, which was cooled with rolls to obtain an unstretched film. This film was heated to 155° C. and then stretched in the machine direction 5 times.

(2) Polypropylene (C) having an MFR of 4.0 g/10 min and a composition (B) prepared by compounding 86.5 wt % polypropylene having an MFR of 4.0 g/10 min with 10 wt % calcium carbonate having an average particle diameter of 1.5 μm and 3.5 wt % high-density polyethylene were separately melt-kneaded with two extruders. The melts were coextruded through a die, and the resulting coextrusion film was laminated to each side of the film stretched 5 times in (1) above, in such a manner that the films (C) constituted the outermost layers. The resulting five-layer laminate was heated to 185° C. and then stretched in the transverse direction 7.5 times.

(3) The surface of this five-layer laminated film was treated with corona discharge. The obtained laminate has a thicknesses of 100 μm ((C)/(B)/(A)/(B)/(C)=5/20/50/20/5 μm).

Properties of this five-layer laminated film are shown in Table 1.

Production Example 4

Synthetic propylene resin tracing paper "YUPO TPG-75" (trade name; thickness, 75 μm), manufactured by Oji-Yuka Synthetic Paper Co., Ltd., Japan, was used, which had a multilayer structure consisting of uniaxially stretched layer/biaxially stretched layer/uniaxially stretched layer.

Production Example 5

General-purpose opaque synthetic paper "YUPO FPG-95" (trade name; thickness, 95 μm), manufactured by Oji-Yuka Synthetic Paper Co., Ltd., was used.

Production Example 6

Synthetic propylene resin paper "YUPO KPK-80" (trade name; thickness, 80 μm), manufactured by Oji-Yuka Synthetic Paper Co., Ltd., was used, which had a multilayer structure consisting of uniaxially stretched layer/biaxially stretched layer/uniaxially stretched layer.

Production Example 7

Single-layer biaxially stretched synthetic polypropylene paper "TOYO PEARL SU" (trade name; thickness, 110 μm), manufactured by Toyobo Co., Ltd., Japan, was used.

Production Example 8

Synthetic paper "PEARL" (trade name; thickness 150 μm), manufactured by Nan-Ya Plastic Co., Ltd., Taiwan, was used, which was a biaxially stretched propylene resin film containing 51 wt % filler.

Production Example 9

Biaxially stretched film "OY PEARL" (trade name; thickness, 100 μm), manufactured by Oji-Yuka Synthetic Paper Co., Ltd., was used, which had a three-layer structure made of a polypropylene resin containing an inorganic filler.

Preparation of Coating Fluids (Coating Fluid 1)

To 100 parts of a pigment mixture consisting of 45 parts of titanium dioxide (JR-600A, manufactured by TAYCA), 35 parts of titanium dioxide (A-220, manufactured by Ishihara Sangyo Kaisha, Ltd., Japan), and 20 parts of precipitated calcium carbonate (Brilliant 15, manufactured by Shiraishi Kogyo Co., Ltd., Japan) was added 0.1 part of a special carboxylic acid (Poise 530, manufactured by Kao Corp., Japan) as a dispersant. The resulting mixture was added to water in such an amount as to result in a solid concentration of 50%, and dispersed therein with a stirror "Delitear" (trade name of Cellier Co., Ltd. for high-speed stirring. To the dispersion were added 55 parts of a water-based polyester resin (Vylonal MD 1200, manufactured by Toyobo Co., Ltd.) and 45 parts of a water-based polyurethane resin (AP-40, manufactured by Dainippon Ink & Chemicals, Inc., Japan) as adhesives.

The following chemicals were further added in the respective amounts per 100 parts of the pigments to finally obtain a coating fluid having a solid concentration of 48%.

Surfactant (F-883, manufactured by Dainippon Ink & Chemicals, Inc.) 0.15 parts

Antistatic agent (Chemistat 6120, manufactured by Sanyo Chemical Industries, Ltd., Japan) 5.0 parts Water resistance improver (Denacol EX-512, manufactured by San Nopco Ltd., Japan) 0.4 parts This coating fluid was applied to a glass plate with a bar coater in an amount of 20 g/m², and the coating was dried to obtain a film.

This film (thickness, 12 μm) had an opacity of 93%.

(Coating Fluid 2)

To 100 parts of a pigment mixture consisting of 20 parts of titanium dioxide (JR-600A, manufactured by TAYCA), 30 parts of titanium dioxide (A-220, manufactured by Ishihara Sangyo Kaisha, Ltd.), and 50 parts of clay (Ultra White 90, manufactured by Engelhard, Ltd., Japan) was added 0.15 parts of a special carboxylic acid (Poise 530, manufactured by Kao Corp.) as a dispersant. The resulting mixture was added to water in such an amount as to result in a solid concentration of 60%, and dispersed therein with the Delitear for high-speed stirring. To the dispersion were added 65 parts of a water-based polyester resin (Vylonal MD 1245, manufactured by Toyobo Co., Ltd.) and 35 parts of a water-based polyurethane resin (AP-40, manufactured by Dainippon Ink & Chemicals, Inc.) as adhesives.

The following chemicals were further added in the respective amounts per 100 parts of the pigments to finally obtain a coating fluid having a solid concentration of 52%.

Surfactant (F-812, manufactured by Dainippon Ink & Chemicals, Inc.) 0.1 part

Antistatic agent (Chemistat 6120, manufactured by Sanyo Chemical Industries, Ltd.) 3.0 parts This coating fluid was applied to a glass plate with a bar coater in an amount of 10 g/m$^2$, and the coating was dried to obtain a film having a thickness of 6 μm. This film was coated with the above-described coating fluid 1 with a bar coater in an amount of 15 g/m$^2$, and the coating was dried to obtain a double-layered film having a total thickness of 13 μm.

This double-layered film was peeled from the glass plate. The opacity thereof was measured and was found to be 93%.

Examples 1, 2, 4, 6–8 and 10 and Comparative Examples 1 to 11

The synthetic papers obtained in Production Examples 1 to 9 were coated twice on one side with coating fluid 1 using a bar coater (manufactured by Kumagaya Riki K.K., Japan) in an amount of 20 g/m$^2$, and the coating was dried to form a film (engraving coating layer) having a thickness of 12 μm or 13 μm. Thus, forgery-preventive fretwork papers were obtained.

In each of these forgery-preventive fretwork papers, spaces for passport number, name, and nationality were formed on the engraving coating layer side by offset printing.

Subsequently, a portrait was formed on each fretwork paper by engraving the paper from the engraving coating layer side with a card-engraving machine in the machine direction, i.e., in the direction perpendicular to the stretching direction for the uniaxially stretched layers, in such a manner that the depth of the engraving reached the uniaxially stretched layer 1b of the support layer (t=3 to 12 μm). Thus, passport samples were obtained.

These passport samples were evaluated as follows.

(1) Recognizability of Fretwork Portrait

The passport samples were held up to the light incident on the support side. Samples in which the portrait was clearly recognized are judged good (o), samples in which the portrait was recognizable are judged fair (Δ), and samples in which the portrait had an unclear outline are judged poor (x).

(2) Abrasion Resistance

The engraved image was rubbed with a nail. Samples in which the image suffered no damage and was free from surface layer debonding are judged good (o), and samples in which the image suffered surface layer debonding are judged poor (x).

(3) Whisker Generation

Samples in which the periphery of the engraved image was free from any whisker (burr) caused by engraving are judged good (o), and samples having such whiskers are judged poor (x).

(4) Paper Feed/discharge and Rumpling

Each passport sample was passed through a copier 500 times to obtain 500 copies. The number of paper feed troubles was counted. After the copying, the original passport sample was examined for rumples.

Comparative Example 7

A passport sample was obtained in the same manner as in Example 7, except that an engraving was formed so that the depth thereof reached nearly the center of the thickness of the biaxially stretched film layer (A) of the support.

The results obtained are shown in Table 1 or 2.

TABLE 1

|  |  | Example 1 | Example 2 | Comparative Example 8 | Example 4 | Comparative Example 9 |
|---|---|---|---|---|---|---|
| Support layer | Production Example | 2 | 6 | 4 | 5 | 3 |
|  | Density (g/cm$^3$) | 1.02 | 1.02 | 1.00 | 0.77 | 0.94 |
|  | Opacity (%) | 62 | 72 | 34 | 92 | 12 |
| Engraving coating layer (coating fluid 1) | Opacity (%) | 93 | 93 | 93 | 93 | 93 |
|  | Thickness (μm) | 12 | 12 | 12 | 12 | 12 |
| Passport Evaluation | Coating film adhesion | o | o | Δ | o | o |
|  | Image recognizability | o | o | Δ | Δ | Δ |
|  | Abrasion resistance | o | o | o | o | o |
|  | Whisker generation | o | o | Δ | o | Δ |
|  | Paper feed/discharge (number of troubles in 500-sheet copying) | 0 | 0 | 0 | 2 | 1 |
|  | Rumpling | none occurred | none occurred | none occurred | none occurred | none occurred |

|  |  | Comparative Example 1 | Comparative Example 2 | Comparative Example 3 | Example 6 |
|---|---|---|---|---|---|
| Support layer | Production Example | 7 | 8 | 9 | 1 |

TABLE 1-continued

|  |  |  |  |  |  |
|---|---|---|---|---|---|
|  | Density (g/cm³) | 0.69 | 1.35 | 0.57 | 0.78 |
|  | Opacity (%) | 89 | 97 | 96 | 94 |
| Engraving coating layer (coating fluid 1) | Opacity (%) | 93 | 93 | 93 | 93 |
|  | Thickness (μm) | 12 | 12 | 12 | 12 |
| Passport Evaluation | Coating film adhesion | ○ | Δ | ○ | ○ |
|  | Image recognizability | Δ | x | x | Δ |
|  | Abrasion resistance | ○ | ○ | ○ | ○ |
|  | Whisker generation | x | x | x | ○ |
|  | Paper feed/discharge (number of troubles in 500-sheet copying) | 0 | 0 | 0 | 2 |
|  | Rumpling | none occurred | none occurred | none occurred | none occurred |

TABLE 2

|  |  | Example 7 | Example 8 | Comparative Example 10 | Example 10 | Comparative Example 11 |
|---|---|---|---|---|---|---|
| Support layer | Production Example | 2 | 6 | 4 | 5 | 3 |
|  | Density (g/cm³) | 1.02 | 1.02 | 1*00 | 0.77 | 0.94 |
|  | Opacity (%) | 62 | 72 | 34 | 92 | 12 |
| Engraving coating layer (coating fluid 2) | Opacity (%) | 93 | 93 | 93 | 93 | 93 |
|  | Thickness (um) | 13 | 13 | i3 | 13 | 13 |
| Passport Evaluation | Coating film adhesion | ○ | ○ | Δ | ○ | ○ |
|  | Image recognizability | ○ | ○ | Δ | Δ | Δ |
|  | Abrasion resistance | ○ | ○ | ○ | ○ | ○ |
|  | Whisker generation | ○ | ○ | Δ | ○ | Δ |
|  | Paper feed/discharge (number of troubles in 500-sheet copying) | 0 | 0 | 0 | 2 | 1 |
|  | Rumpling | none occurred | none occurred | none occurred | none occurred | none occurred |

|  |  | Comparative Example 4 | Comparative Example 5 | Comparative Example 6 | Comparative Example 7 |
|---|---|---|---|---|---|
| Support layer | Production Example | 7 | 8 | 9 | 2 |
|  | Density (g/cm³) | 0.69 | 1.35 | 0.57 | 1.02 |
|  | Opacity (%) | 89 | 97 | 96 | 62 |
| Engraving coating layer (coating | Opacity (%) | 93 | 93 | 93 | 93 |
|  | Thickness (μm) | 13 | 13 | 13 | 13 |
| Passport Evaluation | Coating film adhesion | ○ | Δ | ○ | ○ |
|  | Image recognizability | Δ | x | x | ○ |
|  | Abrasion resistance | ○ | ○ | ○ | ○ |
|  | Whisker generation | x | x | x | x |
|  | Paper feed/discharge (number of troubles in | 0 | 0 | 0 | 0 |

TABLE 2-continued

| | | | | |
|---|---|---|---|---|
| 500-sheet copying) | | | | |
| Rumpling | none occurred | none occurred | none occurred | none occurred |

The forgery-preventive fretwork paper of the present invention is extremely less forgeable (i.e., resistant to forgery), since the engraved image the thickness of which extends from the engraving coating layer to the uniaxially stretched layer of the support is clearly recognized when the fretwork paper is held up to the light incident on the support side. Further, the engraving coating layer is so tough that it never peels off even when the engraved image is rubbed with a nail, etc. Therefore, the forgery-preventive fretwork paper of the present invention is suitable for use as an ID card or the like.

While the invention has been described in detail and with reference to specific examples thereof, it will be apparent to one skilled in the art that various changes and modifications can be made therein without departing from the spirit and scope thereof.

This application is based on Japanese Patent Application No. Hei. 8-113056, filed in the Japanese Patent Office on Mar. 19, 1996, the entire contents of which are hereby incorporated by reference.

What is claimed is:

1. A paper comprising: 1) a support layer which is a stretched laminate which comprises a biaxially stretched propylene resin film layer as a base layer and, laminated thereto on each of front and back sides thereof, a uniaxially stretched propylene resin film layer containing inorganic powder, wherein said support layer has (1) an opacity of from 50 to 100% and (2) a density of from 0.70 to 1.4 g/cm$^3$; and 2) an engraving coating layer and said paper bearing an engraving extending into said engraving coating layer or to one of said uniaxially stretched films of said support layer.

2. The paper of claim 1, wherein said engraving has been formed in a direction perpendicular to a stretching direction for said uniaxially stretched film layers of said support layer.

3. The paper of claim 1, wherein said uniaxially stretched film layers of said support layer each independently has a thickness of from 5 to 30 μm, and said biaxially stretched film layer has a thickness of from 40 to 150 μm.

4. The paper of claim 1, wherein said engraving coating layer comprises a binder resin in an amount of from 20 to 50% by weight on a solid basis and inorganic powder in an amount of from 80 to 50% by weight on a solid basis.

5. The paper of claim 4, wherein said engraving coating layer has an opacity of 40% or higher.

6. The paper of claim 1, wherein said engraving coating layer has a thickness of from 5 to 30 μm.

7. The paper of claim 1, further comprising a primer layer between said support layer and said engraving coating layer.

8. The paper of claim 1, wherein said primer layer has a thickness of from 0.5 to 10 μm.

9. The paper of claim 1, wherein said engraving extends to one of said uniaxially stretched films of said support layer.

10. The paper of claim 9, wherein said engraved support layer has an unengraved layer having a thickness of from 3 to 28 μm.

11. The paper of claim 1, wherein either said biaxially stretched propylene resin film layer, said uniaxially stretched propylene resin layer or both comprises a propylene resin selected from the group consisting of propylene homopolymer, copolymers of propylene as the main monomer with one or more α-olefins, and modified propylene resins produced by grafting 0.1 to 10 wt % one or more vinyl monomers onto these propylene polymers or copolymers.

12. The paper of claim 1, wherein said support layer comprises 10 to 55% by weight based on a weight of said support layer of inorganic powder.

13. The paper of claim 1, wherein said support layer has a density of from 0.90 to 1.2 g/cm$^3$.

14. The paper of claim 11, wherein said propylene resin has a melting point of from 130° to 180° C. and a crystallinity of from 20 to 75%.

15. A method of engraving comprising forming an engraving on the paper of claim 1.

16. The paper of claim 1, wherein said inorganic powder has a particle diameter of from 0.05 to 3 μm.

17. The paper of claim 11 wherein the one or more α-olefins are selected from the group consisting of ethylene, butene-1, hexene-1, heptene-1, octene-1, and 4-methylpentene-1.

18. The paper of claim 11 wherein the one or more vinyl monomers are selected from the group consisting of acrylic acid, methacrylic acid, styrene, methyl acrylate, glycidyl methacrylate, and 2-hydroxyethyl methacrylate.

19. The paper of claim 11 wherein the one of more α-olefins are selected from the group consisting of ethylene, butene-1, hexene-1, heptene-1, octene-1, and 4-methylpentene-1, and the one or more vinyl monomers are selected from the group consisting of acrylic acid, methacrylic acid, styrene, methyl acrylate, glycidyl methacrylate, and 2-hydroxyethyl methacrylate.

* * * * *